United States Patent [19]

Bailey et al.

[11] Patent Number: 5,557,769
[45] Date of Patent: Sep. 17, 1996

[54] MECHANISM AND PROTOCOL FOR MAINTAINING CACHE COHERENCY WITHIN AN INTEGRATED PROCESSOR

[75] Inventors: Joseph A. Bailey, Austin; Steve L. Belt, Pflugerville, both of Tex.

[73] Assignee: Advanced Micro Devices, Sunnyvale, Calif.

[21] Appl. No.: 261,242

[22] Filed: Jun. 17, 1994

[51] Int. Cl.$^6$ ................................................ G06F 12/08
[52] U.S. Cl. ...................... 395/473; 364/264; 364/264.5; 364/242.31; 364/243.41; 364/DIG. 1
[58] Field of Search ..................................... 395/425, 800, 395/473

[56] References Cited

U.S. PATENT DOCUMENTS

| | | | |
|---|---|---|---|
| 5,119,485 | 6/1992 | Ledbetter, Jr. et al. | 395/473 |
| 5,325,504 | 6/1994 | Tipley | 395/425 |
| 5,353,423 | 10/1994 | Hamid | 395/425 |
| 5,355,467 | 10/1994 | Mac Williams | 395/425 |
| 5,426,765 | 6/1995 | Stevens | 395/425 |

FOREIGN PATENT DOCUMENTS

| | | |
|---|---|---|
| 0428149 | 5/1991 | European Pat. Off. . |
| 0567355 | 10/1993 | European Pat. Off. . |
| 9000285 | 1/1990 | WIPO . |

OTHER PUBLICATIONS

Edinfield et al., The 68040 On–Chip Memory Subsystem, 1990 IEEE, pp. 264–269.
Handy, "The Cache Memory Book", Academic Press, Inc., San Diego, California (1993). pp. 158–190.

Primary Examiner—Eric Coleman
Attorney, Agent, or Firm—B. Noel Kivlin

[57] ABSTRACT

An integrated processor includes CPU core, cache memory, and cache controller coupled to a local bus via a local bus interface. The integrated processor further includes memory controller for coupling system memory to the local bus, and a bus interface unit for coupling external peripheral devices to the local bus. The cache controller includes an address tag and state logic circuit which keeps track of a physical address in system memory which corresponds to each entry within cache memory. Address tag and state logic circuit contains state information that indicates whether each cache line is valid and/or dirty. The cache controller includes a snoop control circuit which monitors the local bus to determine whether a memory cycle has been executed by an alternate bus master. During such a memory cycle of an alternate bus master, a comparator circuit determines whether a cache hit has occurred. If a cache read hit occurs with respect to a dirty cache line, the cache controller asserts an inhibit signal which causes the memory controller to ignore the cycle. The read request is instead serviced by the cache controller by providing the requested data from the cache memory to local bus 112. If a cache write operation occurs, data is written into the system memory via system memory controller, and the data is concurrently latched into the corresponding line of the cache memory. The status of cache line may further be updated to clean if the data transfer encompassed a complete cache line.

9 Claims, 5 Drawing Sheets

MECHANISM AND PROTOCOL FOR MAINTAINING CACHE COHERENCY WITHIN AN INTEGRATED PROCESSOR

BACKGROUND OF THE INVENTION

1. Field of the Invention

This invention relates to computer systems that employ integrated processors having cache memory subsystems. The invention also relates to bus transfer mechanisms employed within integrated processors.

2. Description of the Relevant Art

Cache-based computer architectures are typically associated with specialized bus transfer mechanisms to support efficient utilization of the cache memory and to maintain data coherency. A cache memory is a high-speed memory unit interposed in the memory hierarchy of a computer system between a slower system memory and a processor to improve effective memory transfer rates and accordingly improve system performance. The name refers to the fact that the small cache memory unit is essentially hidden and appears transparent to the user, who is aware only of a larger system memory. The cache is usually implemented by semiconductor memory devices having speeds that are comparable to the speed of the processor, while the system memory utilizes a less costly, lower-speed technology. The cache concept anticipates the likely reuse by the microprocessor of selected data in system memory by storing a copy of the selected data in the cache memory.

A cache memory typically includes a plurality of memory sections, wherein each memory section stores a block or a "line" of two or more words of data. For systems based on the particularly popular model 80486 microprocessor, a line consists of four "doublewords" (wherein each doubleword comprises four 8-bit bytes). Each line has associated with it an address tag that uniquely identifies which line of system memory it is a copy of. When a read request originates in the processor for a new word (or a new doubleword or a new byte), whether it be data or instruction, an address tag comparison is made to determine whether a copy of the requested word resides in a line of the cache memory. If present, the data is used directly from the cache. This event is referred to as a cache read "hit". If not present, a line containing the requested word is retrieved from system memory and stored in the cache memory. The requested word is simultaneously supplied to the processor. This event is referred to as a cache read "miss".

In addition to using a cache memory to retrieve data, the processor may also write data directly to the cache memory instead of to the system memory. When the processor desires to write data to memory, an address tag comparison is made to determine whether the line into which data is to be written resides in the cache memory. If the line is present in the cache memory, the data is written directly into the line. This event is referred to as a cache write "hit". As will be explained in greater detail below, in many systems a data "dirty bit" for the line is then set. The dirty bit indicates that data stored within the line is dirty (i.e., has been modified), and thus, before the line is deleted from the cache memory or overwritten, the modified data must be written into system memory.

If the line into which data is to be written does not exist in the cache memory, the line is either fetched into the cache memory from system memory to allow the data to be written into the cache, or the data is written directly into the system memory. This event is referred to as a cache write "miss". A line which is overwritten or copied out of the cache memory when new data is stored in the cache memory is referred to as a victim block or a victim line.

Cache memories can be optimized according to a number of different techniques. One aspect that affects system performance and design complexity is the handling of writes initiated by the processor or by an alternate bus master. As explained previously, because two copies of a particular piece of data or instruction code can exist, one in system memory and a duplicate copy in the cache, writes to either the system memory or the cache memory can result in an incoherence between the two storage units. For example, consider the case in which the same data is initially stored at a predetermined address in both the cache memory and the system memory. If the processor subsequently initiates a write cycle to store a new data item at the predetermined address, a cache write "hit" occurs and the processor proceeds to write the new data into the cache memory at the predetermined address. Since the data is modified in the cache memory but not in system memory, the cache memory and system memory become incoherent. Similarly, in systems with an alternate bus master, write cycles to system memory by the alternate bus master modify data in system memory but not in the cache memory. Again, the cache memory and system memory become incoherent.

An incoherence between the cache memory and system memory during processor writes can be prevented or handled by implementing one of several commonly employed techniques. In a first technique, a "write-through" cache guarantees consistency between the cache memory and system memory by writing the same data to both the cache memory and system memory. The contents of the cache memory and system memory are always identical, and thus the two storage systems are always coherent. In a second technique, a "write-back" cache handles processor writes by writing only to the cache memory and setting a "dirty" bit to indicate cache entries which have been altered by the processor. When "dirty" or altered cache entries are later replaced during a "cache replacement" cycle, the modified data is written back into system memory.

An incoherence between the cache memory and system memory during a write operation by an alternate bus master is handled somewhat differently. For a system that employs write-back caching, one of a variety of bus monitoring or "snooping" techniques may be implemented to determine whether certain lines of data within the cache memory should be invalidated or written-back to system memory when the alternate bus master attempts to write data to system memory. One such technique implemented within 80486-based systems is referred to as the "MESI" protocol. For systems that employ the MESI protocol, when an alternate bus master attempts to write data to system memory, a cache controller determines whether a corresponding line of data is contained within the cache memory. If a corresponding line is not contained by the cache memory, no additional action is taken by the cache controller, and the write cycle initiated by the alternate bus master is allowed to complete. If, on the other hand, a corresponding line of data is contained in the cache memory, the cache controller determines whether that line of data is dirty or clean. If the line is clean, the line is marked invalid by the cache controller and the transfer of data from the alternate bus master into system memory is allowed to complete. The line of data must be marked invalid since the modified (and thus the most up-to-date) data is now contained only within the system memory (following completion of the write cycle by the alternate bus master). If the line of data is instead dirty, a snoop write-back cycle is initiated by the cache controller which causes the alternate bus master to "back-off" and release mastership of the system bus. The cache controller then causes the entire line of dirty data within the cache memory to be written back into system memory. The snoop write-back cycle may be accomplished by executing a burst write cycle to system memory. As is well known to those of skill in the art, during the data phase of a burst cycle, a new word (or doubleword) may be written to the system memory for each of several successive clock cycles without intervening address phases. The fastest burst cycle (no wait states) requires two clock cycles for the first word (one clock for the address, one clock for the corresponding word), with subsequent words written to sequential addresses on every subsequent clock cycle. When the cache controller finishes the dirty line write back, the line is marked clean (unmodified).

After the snoop write-back cycle completes, the alternate bus master re-obtains mastership of the system bus, and the write cycle by the alternate bus master is again executed. At this point, the new data is allowed to be written into the system memory. The cache controller observing the write by the alternate bus master to the now clean memory location in system memory, now invalidates the line in the cache as previously described. It is noted that the snoop write-back cycle ensures that data coherency is maintained even if the writing of data from the alternate bus master does not involve an entire cache line.

An incoherence between the cache memory and the system memory during a read operation by an alternate bus master is treated similarly. When an alternate bus master attempts to read data from system memory, the cache controller determines whether a corresponding line of data is contained within the cache memory. If a corresponding line is contained by the cache memory, and if the corresponding line is dirty, a snoop write-back cycle is initiated by the cache controller which causes the alternate bus master to back-off and release mastership of the system bus. The cache controller then causes the entire line of dirty data within the cache memory to be written back into system memory. After the write-back cycle completes, the alternate bus master re-obtains mastership of the system bus, and the read cycle by the alternate bus master is re-initiated. At this point, the data within the system memory is allowed to be read.

When the snoop write-back cycles as described above are executed to maintain data coherency during read and write operations of an alternate bus master, the bandwidth of the CPU local bus is degraded since the alternate bus master must wait for the write-back cycle to complete before performing its desired data transfer. It would therefore be desirable to provide a system wherein cache coherency is maintained while avoiding the necessity of snoop write-back operations.

In recent years, integrated processors have been developed to replace previously discrete microprocessors and associated peripheral devices within computer systems. An integrated processor is an integrated circuit that performs the functions of both a microprocessor and various peripheral devices such as, for example, a memory controller, a DMA controller, a timer, and a bus interface unit, among other things. The introduction of integrated processors has allowed for decreases in the overall cost, size, and weight of computer systems, and has in many cases accommodated improved performance characteristics of the computer systems. Integrated processors that implement a model 80486-compatible instruction set typically employ the MESI protocol consistent with their discreet component counterparts. This ensures backwards compatibility with peripherals such as memory controllers and I/O devices that were designed for use within 80486-based systems. Unfortunately, employment of the protocol described above within integrated processors limits the overall performance of the computer system since snoop write-back cycles must be accommodated, thus limiting the bandwidth of the CPU local bus. It is desirable to provide an integrated processor which is backwards compatible with 80486-type external peripherals while attaining high overall system performance.

SUMMARY OF THE INVENTION

The problems outlined above are in large part solved by an integrated processor employing a mechanism and protocol for maintaining cache coherency within an integrated processor according to the present invention. In one embodiment, an integrated processor is provided that includes a CPU core, a cache memory, and a cache controller coupled to a local bus via a local bus interface. The integrated processor further includes a memory controller for coupling a system memory to the local bus, and a bus interface unit for coupling external peripheral devices to the local bus. The cache controller includes an address tag and state logic circuit which keeps track of a physical address in the system memory which corresponds to each entry within the cache memory. The address tag and state logic circuit further contains state information that indicates whether each cache line is valid and/or dirty. The cache controller further includes a snoop control circuit which monitors the local bus to determine whether a memory cycle has been executed by an alternate bus master. During such a memory cycle of an alternate bus master, a comparator circuit determines whether a cache hit has occurred. If a cache read hit occurs with respect to a dirty cache line, the cache controller asserts an inhibit signal which causes the memory controller to ignore the cycle. The read request is instead serviced by the cache controller by providing the requested data from the cache memory to the local bus 112. If a cache write operation occurs, the data is written into the system memory via the system memory controller, and the data is concurrently latched into the corresponding line of the cache memory. The status of the cache line may further be updated to clean if the data transfer encompassed a complete cache line. Snoop write-back cycles are not necessary to maintain data coherency. As a result, the integrated processor advantageously reduces the traffic on the local bus and thereby improves the overall bandwidth of the computer system.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
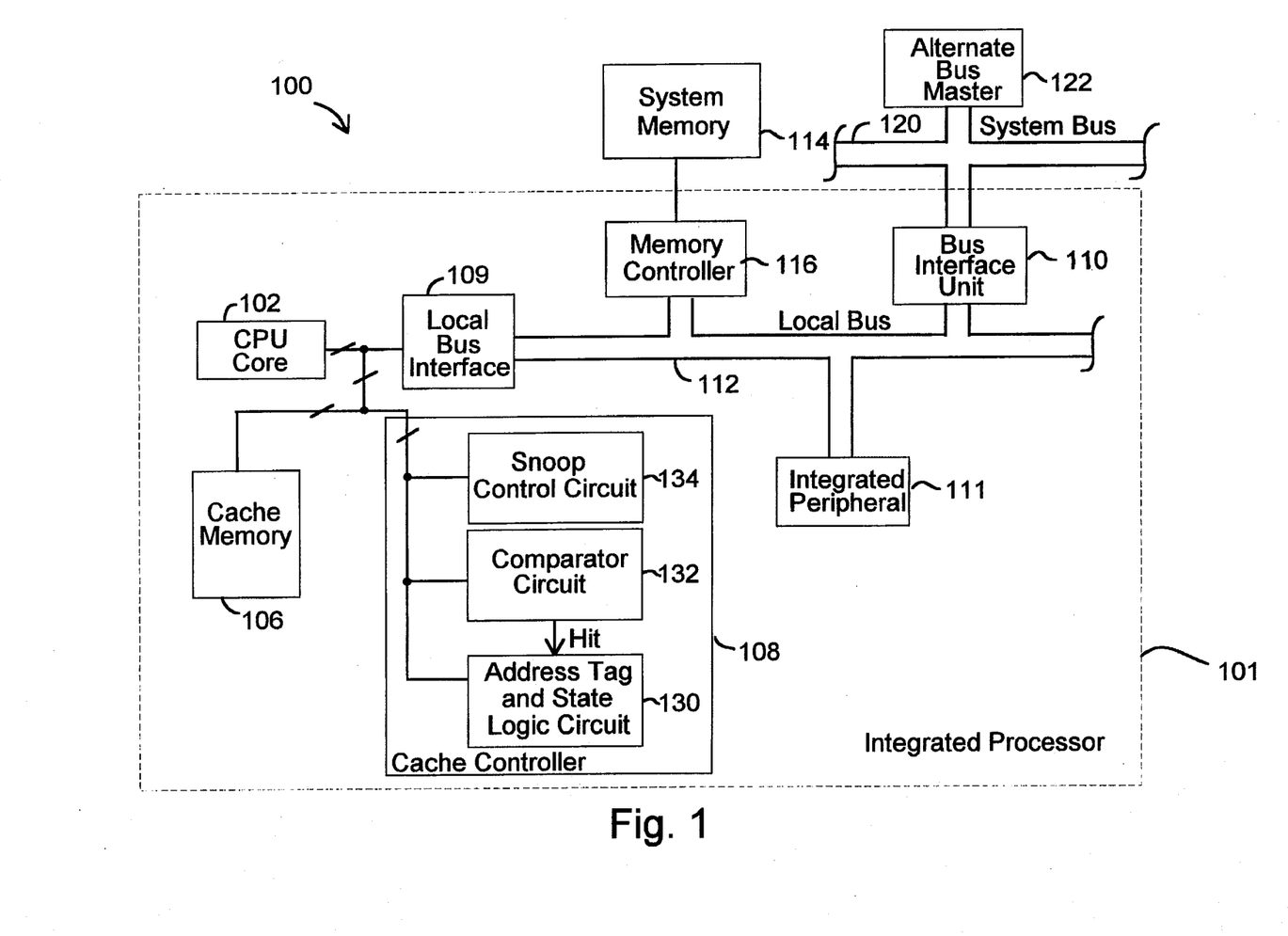
FIG. 1 is a block diagram of a computer system including an integrated processor that employs a cache controller in accordance with the present invention.

Turning now to the drawings, FIG. 1 is a block diagram of a computer system 100 to which the present invention is adapted. An integrated processor 101 is illustrated which includes a CPU core 102 coupled to a cache memory 106 and a cache controller 108. CPU core 101, cache memory 106, and cache controller 108 are coupled to a local bus 112 via a local bus interface 109. Integrated processor 101 further includes a bus interface unit 110, an integrated peripheral 111, and a memory controller 116 coupled to CPU core 102 via local bus 112 and local bus interface 109. Bus interface unit 110 provides an interface between an external system bus 120 and the local bus 112. An external system memory 114 is coupled to local bus 112 through memory controller 116. An alternate bus master 122 is finally shown coupled to system bus 120.

In its illustrated form, computer system 100 embodies a single processor, single-cache architecture. It is understood, however, that the present invention may be adapted to multi-processor and/or multi-cache systems. It is further understood that a variety of other devices may be coupled to system bus 112.

System bus 120 may be any suitable bus for coupling peripheral devices such as CD-ROM units and local area network (LAN) devices to the internal components of integrated processor 101. Exemplary peripheral bus standards include the ISA (Industry Standard Architecture) bus, the EISA (Extended Industry Standard Architecture) bus and the PCI (Peripheral Connect Interface) bus. Bus interface unit 110 provides an interface between system bus 120 and local bus 112.

CPU core 102 is a data processing unit that implements a predetermined instruction set. Exemplary processing units include the models 80386 and 80486 microprocessors.

Cache controller 108 orchestrates and manages the transfer of data between processing unit 102, cache memory 106 and local bus 112. In their preferred form, processing unit 102, cache memory 106 and cache controller 108 operate concurrently to provide maximum sustained performance in the computer system 100.

Local bus 112 has a predetermined bit width and is the integrated processor's primary bus. System memory 114 is a physical memory of a predetermined size and may be implemented with DRAM (dynamic random access memory). Memory controller 116 controls and orchestrates the transfer of data, address and control signals communicating between local bus 112 and system memory 114.

Integrated peripheral 111 is illustrative of a variety of possible peripheral devices incorporated as an integral part of integrated processor 101. Exemplary peripheral devices include a DMA controller, an interrupt controller, and a timer.

Bus master 122 is illustrative of a variety of bus mastering devices. Exemplary alternate bus masters include disk drives, CD ROM units, and local area network (LAN) devices.

Associated with each line of cache memory 106 is address tag and state information. The address tag indicates a physical address in system memory 114 corresponding to each entry within cache memory 106. In this embodiment each entry within cache memory 106 is capable of storing a line of data. A line of data consists of four doublewords (where each doubleword comprises 32 bits). It is understood, however, that a line could contain any number of words or doublewords, depending upon the system. It is further understood that a doubleword could consist of any number of bits.

The state information is comprised of a valid bit and a dirty bit for each line of data. The valid bit indicates whether a predetermined cache line contains valid cache data, while the dirty bit identifies the write status of each cache line. In an invalid state, there is no valid data in the corresponding cache memory entry. In a valid and clean state, the cache memory entry contains data which is consistent with system memory 114. In a valid and dirty state, the cache memory entry contains valid data which is inconsistent with system memory 114. Typically, the dirty state results when a cache memory entry is altered by a write operation. It is noted that for multi-cache systems, additional state information may be indicated (i.e., shared, exclusive, modified).

Cache controller 108 includes an address tag and state logic circuit 130 that contains and manages the address tag and state information, a comparator circuit 132 for determining whether a cache hit has occurred, and a snoop circuit 134 that snoops alternate bus master cycles on local bus 112 and determines whether memory controller 116 should be inhibited or whether write data should be "snarfed" into cache memory 106. The operation of the snoop control circuit 134 will be described in further detail below. It will be appreciated by those skilled in the art that cache controller 108 may contain additional conventional circuitry to control well-known caching functions such as various read, write, update, invalidate, copy-back, and flush operations. Such circuitry may be implemented using a variety of specific circuit configurations. Examples of such specific circuit configurations may be found in a host of publications of the known prior art, including U.S. Pat. No. 5,091,875 issued to Rubinfeld on Feb. 25, 1992 and U.S. Pat. No. 5,091,876 issued to Sachs et al. on Feb. 25, 1992.

As stated previously, each line of data within cache memory 106 is associated with four doublewords of data. Address tag and state logic circuit 110 indicates a physical address in system memory 114 corresponding to each line entry within cache memory 106, and further stores a valid bit and a dirty bit associated with each line of data. As will be better understood from the following, the snoop control circuit 134 monitors cycles executing on local bus 112 and detects the initiation of a memory cycle (i.e., read or write cycle) by an alternate bus master. If a cache hit with respect to dirty data occurs during a read cycle of the alternate bus master, the snoop control circuit 134 generates an inhibit signal that prevents memory controller 116 from responding to the cycle. Instead, the dirty data is provided directly from cache memory 106. As the data from cache memory 106 is driven on local bus 112 by local bus interface unit 109, the memory controller 116 may latch in the data to update system memory 114 concurrently with the transfer of data to the alternate bus master. When the alternate bus master initiates a write operation and a cache hit occurs, the write to system memory 114 is allowed to complete, and the snoop control circuit 134 concurrently causes the data to be stored within cache memory 106. Specific details follow.

Figure 2A:
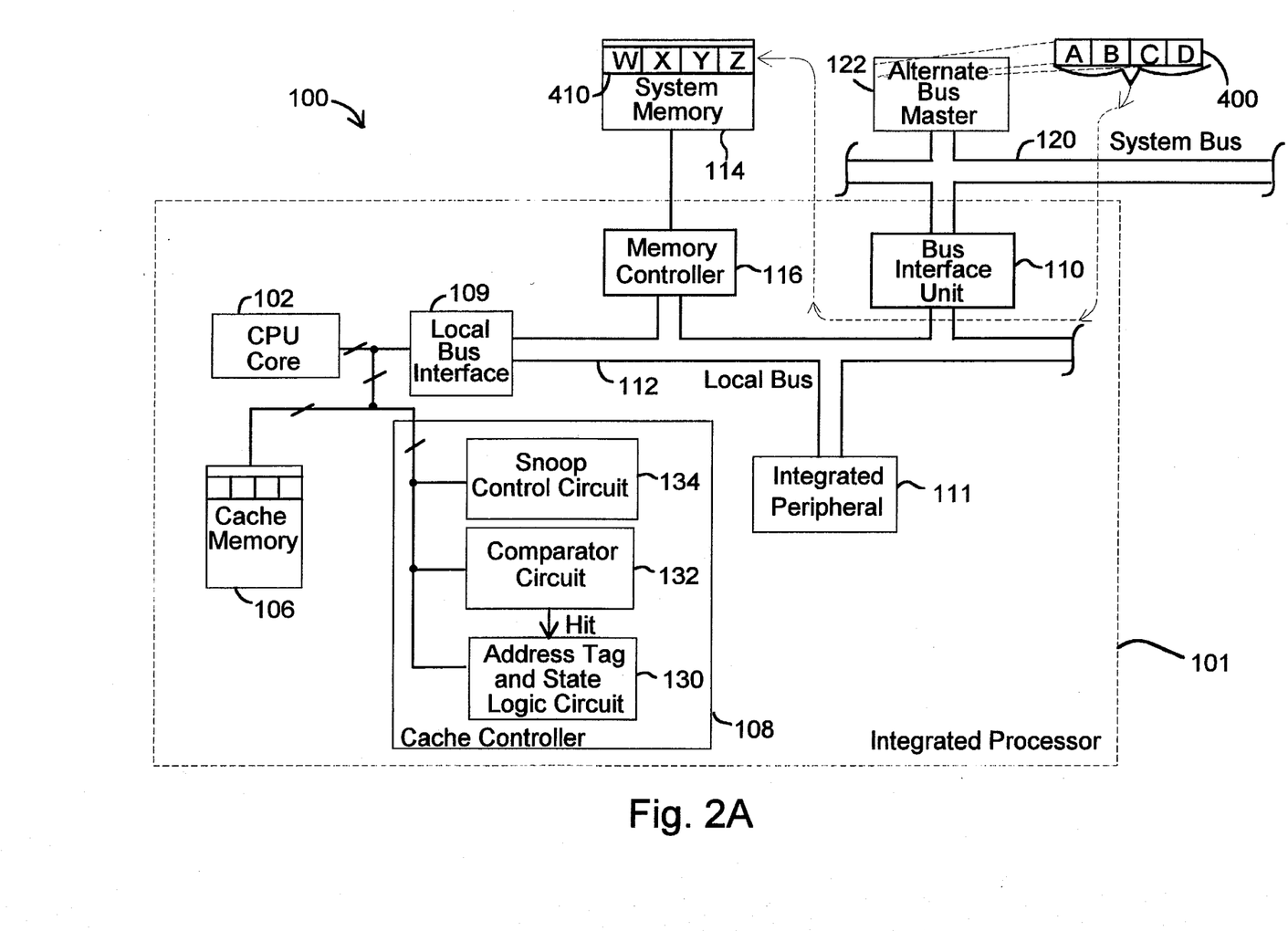
FIGS. 2A, 2B, 2C are block diagrams that illustrate the flow of data within the computer system of FIG. 1 upon the occurrence of a write cycle by an alternate bus master.
Figure 2B:
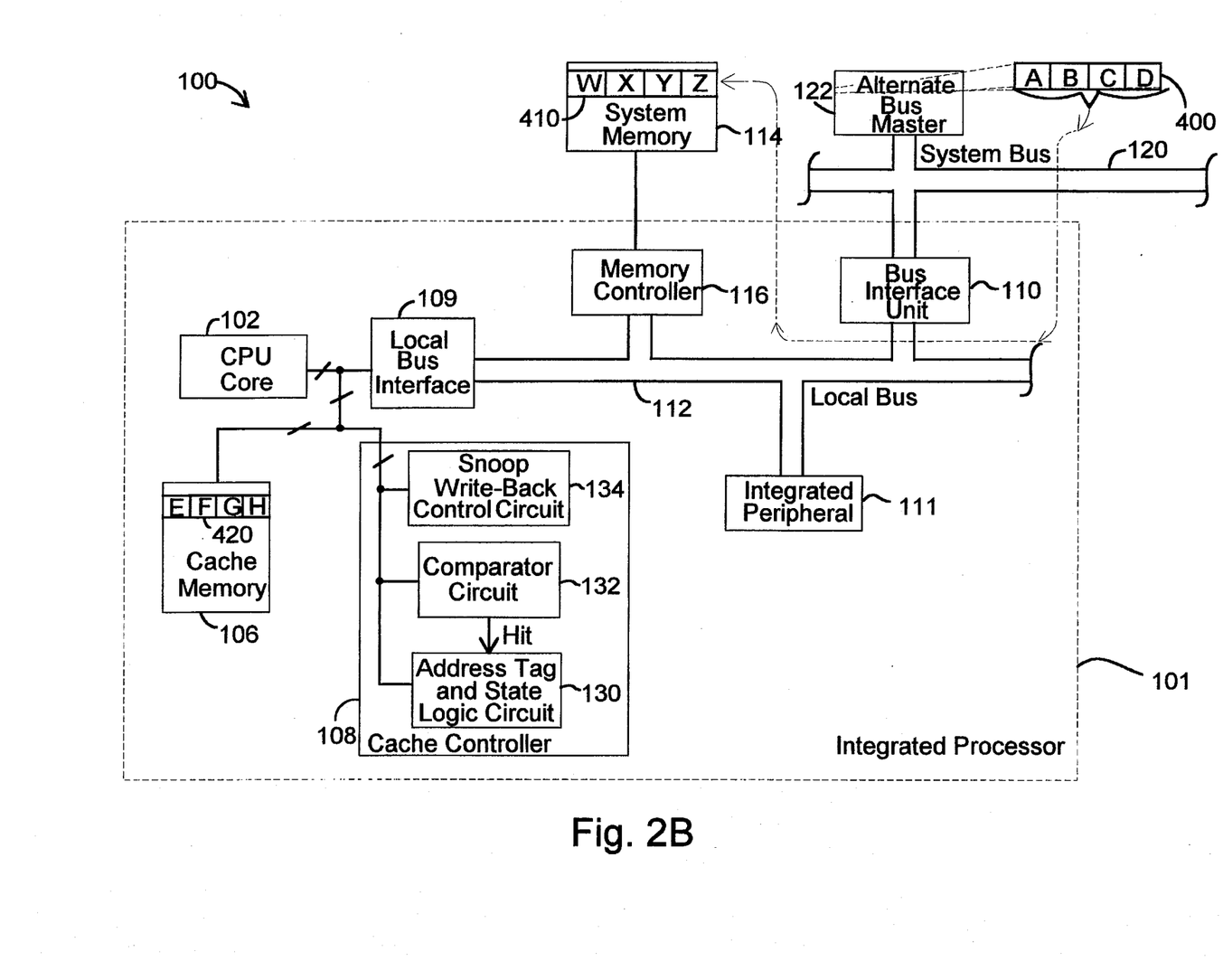
Figure 2C:
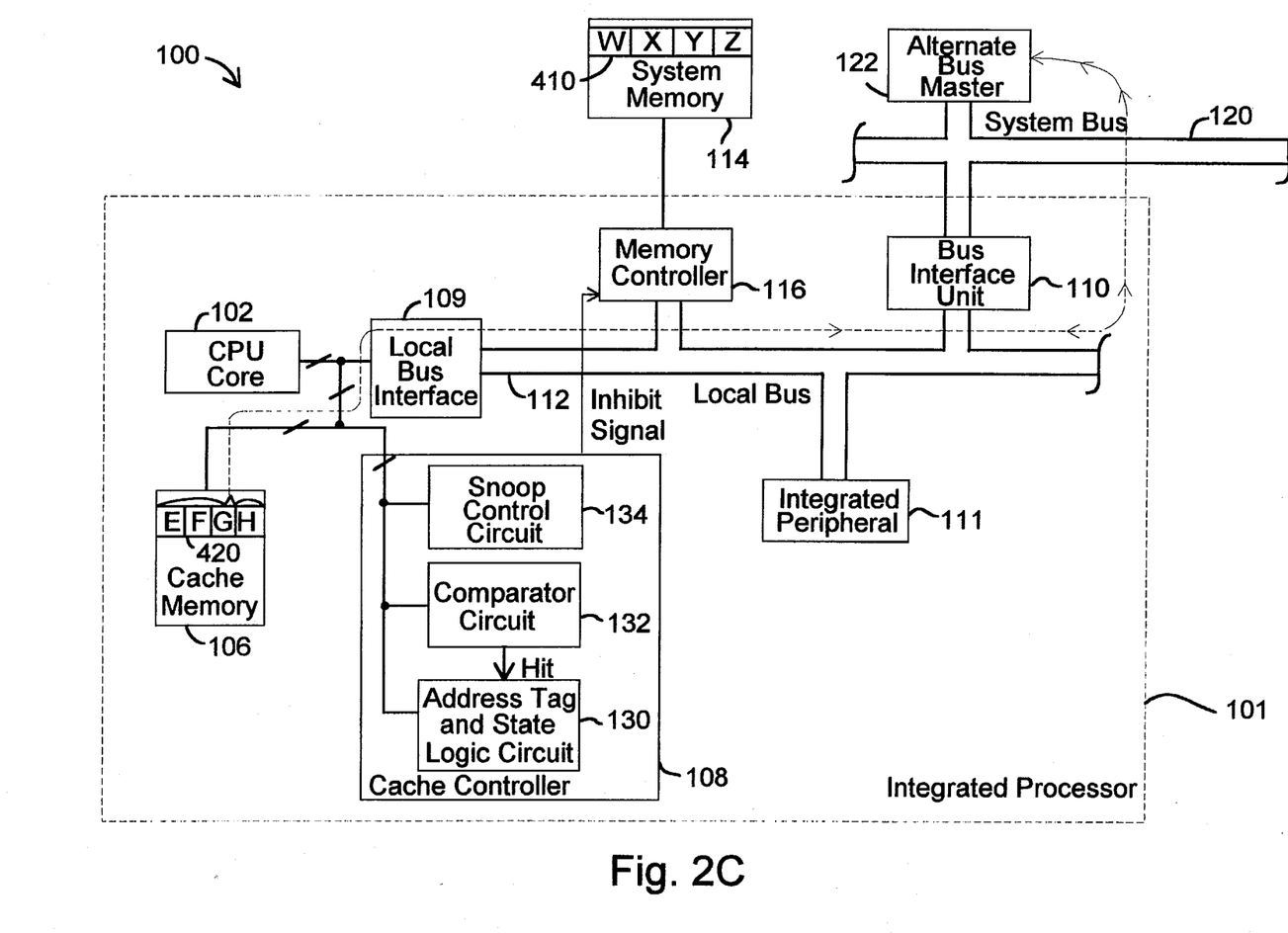

FIGS. 2A–2C are block diagrams that illustrate the flow of data within computer system 100 when selected operations by alternate bus master 122 occur (i.e., to transfer data from the alternate bus master 120 to system memory 114, or vice versa). It is noted that the flow of data is similar for situations in which integrated peripheral 111 is a bus mastering device. As will be explained in detail below, the particular data transfers that occur during such operations are dependent upon the type of cycle being initiated and upon the status of data (i.e., clean, dirty, invalid) within cache memory 106. It will be appreciated that for each of the illustrated operations, coherency between cache memory 106 and system memory 114 is maintained.

Referring first to FIG. 2A, a write operation is depicted for a situation wherein the alternate bus master 122 desires to write a line of data 400 into a memory region 410 of system memory 114. In this example, line 400 consists of four doublewords "A", "B", "C" and "D", and memory region 410 consists of four doubleword address locations "W", "X", "Y" and "Z". When the write operation is initiated, the cycle is detected by snoop control circuit 134 and an address tag comparison is made by comparator circuit 132 to determine whether cache memory 106 contains a valid line of data corresponding to the memory region 410 to which line 400 is to be written (i.e., by comparing the line address on local bus 112 to the address tags within address tag and state logic circuit 130). If cache memory 106 does not contain a corresponding valid line, a cache miss has occurred and the line 400 of data is transferred into system memory 114. This data transfer is typically accomplished by executing a single burst write cycle on system bus 112 to write the doublewords "A", "B", "C", and "D" into address locations "W", "X", "Y", and "Z", respectively. It is noted, however, that separate write cycles could be executed to transfer the doublewords separately. Since the cache memory 106 in this situation does not contain a line corresponding to memory region 410, a data incoherency does not exist prior to the execution of or after completion of the data transfer. Therefore, there is no need to update data or change the status of data within cache memory 106. It is noted that a similar operation occurs when alternate bus master 122 writes a single doubleword to system memory 114. It is further noted that a similar data transfer also occurs for situations in which the alternate bus master 122 desires to read (rather than write) a line of data 410 and a cache miss occurs. Of course, for such a situation, the line data 410 is transferred from system memory 114 to alternate bus master 122.

FIG. 2B illustrates a similar data transfer that is effectuated when a cache "hit" to "clean" data occurs within the cache memory 106 during a DMA write operation. It is noted that alternative bus master 122 may execute a cycle to transfer a single doubleword within line 400 or several doublewords within line 400 (i.e., any one or more of the doublewords "A", "B", "C", and "D"). As mentioned previously, a cache "hit" occurs when the cache memory 106 contains an associated line 420 which corresponds to the memory region 410 of system memory 114 to which alternative bus master 122 desires to transfer. The "hit" line 420 is clean if it contains data that is identical to the corresponding data stored within memory region 410 of system memory 114. That is, line 420 is clean if its component doublewords "E", "F", "G" and "H" are all identical to the doublewords stored within address locations "W", "X", "Y" and "Z", respectively. As illustrated in the figure, when such a DMA write occurs with clean data in the cache, the line 400 is written into memory region 410 by executing a write cycle (i.e., a single write or burst write) on system bus 120 which is correspondingly transferred to local bus 112 via bus interface unit 110. Similar to the previously described transfer of FIG. 2A, the selected doublewords "A", "B", "C", and/or "D" are written into the corresponding address locations "W", "X", "Y", and "Z", respectively. To maintain cache coherency during this situation, the snoop control circuit 134 causes the selected doublewords "A", "B", "C", and/or "D" to be stored within the corresponding locations of line 420 of cache memory 106. If a read cycle to clean data within cache memory 106 occurs, on the other hand, the read is serviced directly by memory controller 116 and no action is taken by cache controller 108.

Operation of computer system 100 is next considered for the case in which one or more of the doublewords "E", "F", "G", and "H" within line 420 are marked as dirty by address tag and state logic circuit 130. As will be appreciated by those skilled in the art, a doubleword within line 420 may have been previously marked as dirty by address tag and state logic circuit 130 if the doubleword was written into cache memory 106 from CPU core 102 without updating system memory 114.

Referring again to FIG. 2B, the operation of computer system 100 when line 420 is marked dirty during a write cycle by alternate bus master 122 is identical to that described above for the situation in which the data residing within cache memory 106 is clean. Thus, as the data from alternate bus master 122 is transferred via bus interface unit 110 to system memory 114, the snoop control circuit 134 causes the data to be simultaneously latched within the corresponding locations of line 420 of cache memory 106. In one embodiment, the entire line of doublewords was transferred during the cycle, snoop control circuit 134 causes the address tag and state logic circuit 130 to identify line 420 as clean. If, on the other hand, only selected doublewords comprising the line 420 were written, the dirty state of line 420 as marked by address tag and state logic circuit is maintained. This indicates that the data within line 420 may not be identical to the corresponding line 410 of system memory 114, and thus may need to be copied back to system memory 114 during a cache replacement cycle.

In an alternative configuration, when alternate bus master 122 executes a write cycle to system memory 114 that is associated with a dirty line of data 420 within cache memory 106, the snoop control circuit 134 inhibits memory controller 116 from responding to the cycle. Instead, the write data is latched into the corresponding locations of line 420 of cache memory 106. The line 420 continues to be marked as dirty by address tag and state logic circuit 130.

Referring still to FIG. 2B, if alternate bus master 122 initiates a read cycle to read a line, such as line 410, of data within system memory 114 and a corresponding line 420 resides within cache memory 106, the operation of computer system 100 again depends on whether the corresponding line 420 is clean or dirty. If the line 420 is clean, the corresponding line 410 of system memory 114 is accessed directly through memory controller 116. In other words, the requested doublewords are provided from system memory 114 through memory controller 116 and bus interface unit 110 to alternate bus master 122.

FIG. 2C illustrates the data transfers effectuated when alternate bus master 122 attempts to read the line of data 400 (or selected doublewords thereof) from system memory 114 and a cache "hit" occurs with corresponding "dirty" data residing within cache memory 106. For this situation, the snoop control circuit 134 asserts an inhibit signal which causes memory controller 116 to essentially ignore the cycle. The cycle is instead serviced by cache controller 108 by providing the requested data from the line 420 of cache memory 106 to the local bus 112 via local bus interface 109. Since the memory controller 116 is inhibited, the data is not provided from system memory 410. For this situation, it will be appreciated that the most up-to-date data is provided to the alternate bus master 122, and data integrity is thereby maintained. It will further be appreciated that snoop write-back cycles are not necessary, and that integrated peripheral 111 as well as alternate bus master 122 may be embodied by conventional 80486-type peripherals. Optimal system performance may thereby be attained while maintaining broad system compatibility.

Figure 3:
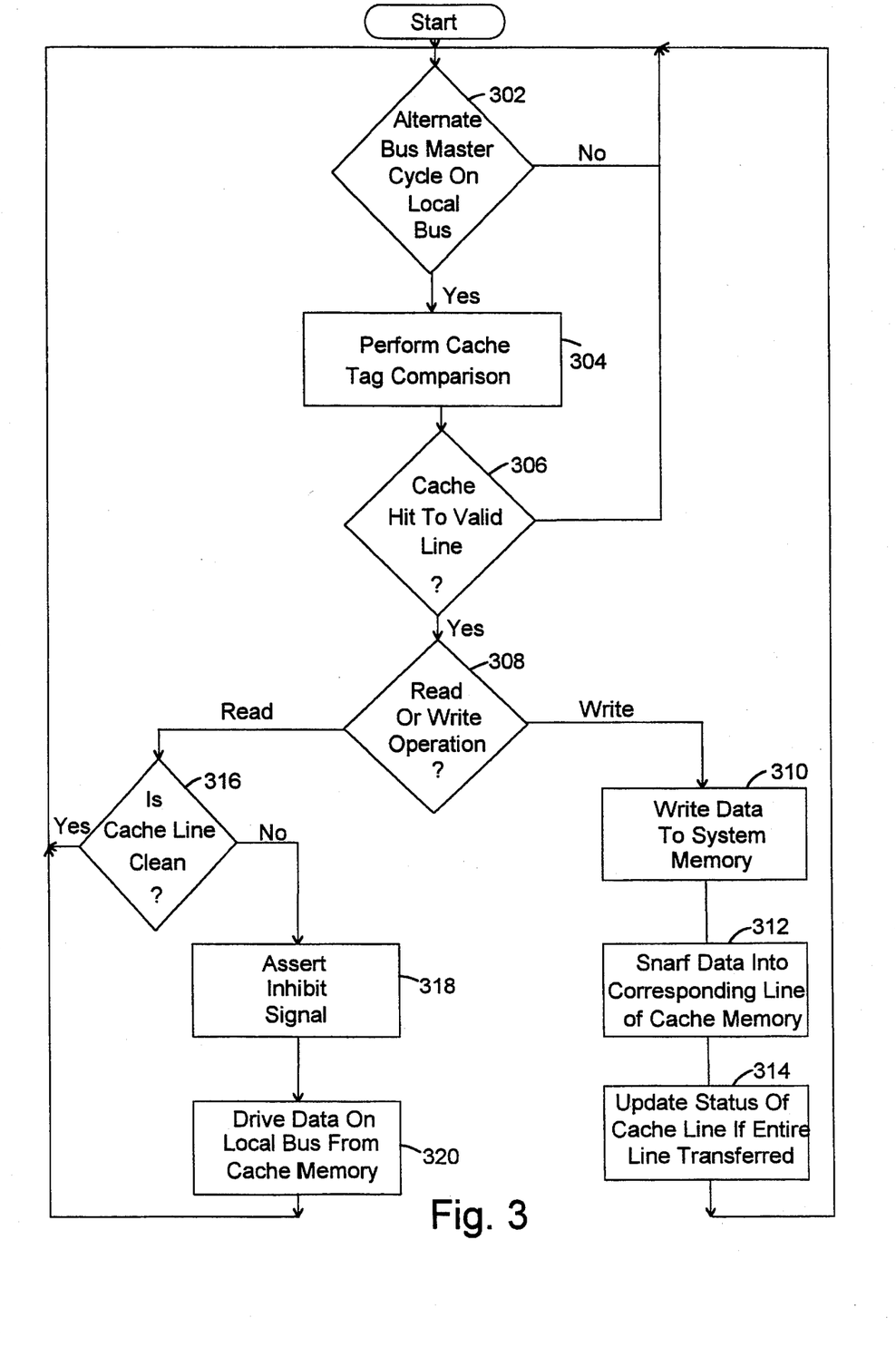
FIG. 3 is a flow diagram that illustrates the operation of the cache controller of FIG. 1.

FIG. 3 is a flow diagram that illustrates the operation of cache controller 108. If a cycle on local bus 112 is detected by snoop control circuit 134 during step 302, a cache tag comparison operation is performed during step 304. If a cache hit to a valid line occurs, as determined by step 306, it is determined whether the current operation is a read operation or a write operation during step 308. If the cycle is a write operation, the data is written into the corresponding locations of system memory 114 during step 310, and the data is concurrently "snarfed" (or latched) into the corresponding line of cache memory 106 during step 312. The address tag and state logic circuit 130 further updates the corresponding cache line as clean if the transfer encompassed a complete valid line. The state of the cache controller 108 then reverts back to step 302 to determine whether additional alternate bus master cycles are being executed on local bus 112.

As explained previously, in one embodiment, the cache controller 108 may be alternatively configured such that during a write operation by an alternate bus master, rather than writing data to system memory 114 when a cache hit occurs with respect to either dirty or clean data within cache memory 106, an inhibit signal may be asserted by snoop control circuit 134 to inhibit memory controller 116 from responding to the cycle. Thus, the data is written directly into the corresponding locations of cache memory 106, and the corresponding line is marked dirty by address tag and state logic circuit 130.

Referring back to FIG. 3, if the current operation is determined to be a read operation during step 308, it is determined whether the cache line is clean or dirty during step 316. If the cache line is clean, the corresponding line of system memory 114 is accessed directly through memory controller 116, and the status of data within cache memory 106 remains unchanged. On the other hand, if the cache line within cache memory 106 is dirty (as determined by step 316), the inhibit signal is asserted by snoop control circuit 134 which causes memory controller 116 to ignore the current cycle (step 318). The requested data is then driven on local bus 112 from cache memory 106 via local bus 109. This completes the requested operation.

The cache controller 108 and memory controller 116 may be reduced to sequential logic circuits by employing computer-aided design tools. Exemplary computer-aided design tools include the behavioral language Verilog as well as the VHSIC hardware description language.

It is noted that the present invention may be implemented in conjunction with a variety of other bus transfer techniques and alternative system configurations. For example, the present invention may be implemented in conjunction with systems employing either non-pipelining or pipelining techniques. Similarly, the present invention may be implemented within multi-processor and/or multi-cache systems.

Numerous variations and modifications will become apparent to those skilled in the art once the above disclosure is fully appreciated. For example, the number of words that comprise a predefined line within the cache memory may vary without departing from the spirit and scope of the present invention. It is intended that the following claims be interpreted to embrace all such variations and modifications.

What is claimed is:

1. A computer system comprising:

a system bus;

a system memory;

an alternate bus master coupled to said system bus wherein said bus master is configured to execute a memory cycle on said system bus; and an integrated processor formed on a single semiconductor chip including:

a bus interface unit configured to couple said system bus to a local bus;

a cache memory operatively coupled to said local bus;

a processing unit coupled to said cache memory;

a system memory controller operatively coupled to said local bus and to said system memory and configured to control the storage and retrieval of data within said system memory;

a cache controller operatively coupled to said cache memory and to said local bus configured to control the storage and retrieval of data within said cache memory, wherein said cache controller includes:

a tag logic circuit configured to store a plurality of line addresses indicative of a plurality of lines of data stored within said cache memory and configured to store at least one dirty bit associated with each line;

a comparator circuit coupled to said tag logic circuit configured to determine whether a cache hit has occurred during a designated memory cycle; and a snoop control circuit coupled to said comparator circuit, wherein said snoop control circuit is configured to inhibit said memory controller during a read cycle which is associated with dirty cached data, wherein said snoop control circuit is configured to cause said dirty cached data to be driven on said local bus in response to said memory cycle; and wherein said snoop control circuit is further configured to latch data to be stored within a corresponding memory location of said cache memory during a write operation of said alternate bus master, and to concurrently latch said data within said memory controller.

2. The computer system as recited in claim 1 wherein said read cycle is initiated by said alternate bus master.

3. The computer system as recited in claim 1 wherein said alternate bus master is a bus bridge.

4. The computer system as recited in claim 1 wherein said cache line is marked clean by said tag logic circuit if said write operation involves an entire cache line.

5. An integrated processor formed on a single semiconductor chip comprising:

a CPU core;

a bus operatively coupled to said CPU core and configured to transfer data signals;

a cache memory operatively coupled to said bus;

a system memory controller operatively coupled to said bus and configured to control the storage and retrieval of data within a system memory;

an alternative bus master device coupled to said bus, wherein said alternate bus master device is configured to execute a memory cycle on said bus; and a cache controller operatively coupled to said cache memory and to said bus configured to control the storage and retrieval of data within said cache memory, wherein said cache controller includes:
  a tag logic circuit configured to store a plurality of line addresses indicative of a plurality of lines of data stored within said cache memory and configured to store at least one dirty bit associated with each line;
  a comparator circuit coupled to said tag logic circuit configured to determine whether a cache hit has occurred during a designated memory cycle; and
a snoop control circuit coupled to said comparator circuit, wherein said snoop control circuit is configured to inhibit said memory controller during a read cycle which is associated with dirty cached data, and said snoop control circuit is configured to cause said dirty cached data to be driven on said local bus in response to said memory cycle; said snoop control circuit being further configured to latch data to be stored within a corresponding memory location of said cache memory during a write operation of said alternate bus master, and to concurrently latch said data within said memory controller.

6. The integrated processor as recited in claim 5 wherein said read cycle is initiated by said alternate bus master.

7. The integrated processor as recited in claim 5 wherein said alternate bus master is a bus bridge.

8. The integrated processor as recited in claim 5 wherein said cache line is marked clean by said tag logic circuit if said write operation involves an entire cache line.

9. A cache control method for an integrated processor formed on a single semiconductor chip comprising the steps of:

storing a plurality of line addresses indicative of a plurality of lines of data within a cache memory;

storing a plurality of dirty bits associated with each line address;

initiating a memory read cycle to transfer data from a system memory to an alternate bus master;

detecting said memory cycle within a cache controller;

determining whether a corresponding line resides within said cache memory;

determining whether said corresponding line is dirty;

inhibiting said system memory from providing data of a requested address to said alternate bus master if said corresponding line resides within said cache memory and if said line is dirty;

providing said data corresponding to said requested address from said cache memory; and latching data concurrently within said memory controller and a corresponding memory location of said cache memory during a write operation of said alternate bus master.

* * * * *